Oct. 12, 1965   W. B. TEMPLETON   3,211,270
LINE FIND MECHANISM
Filed Aug. 19, 1963   5 Sheets-Sheet 1

INVENTOR.
WILLIAM B. TEMPLETON,
BY
Wallace P. Lamb
ATTORNEY.

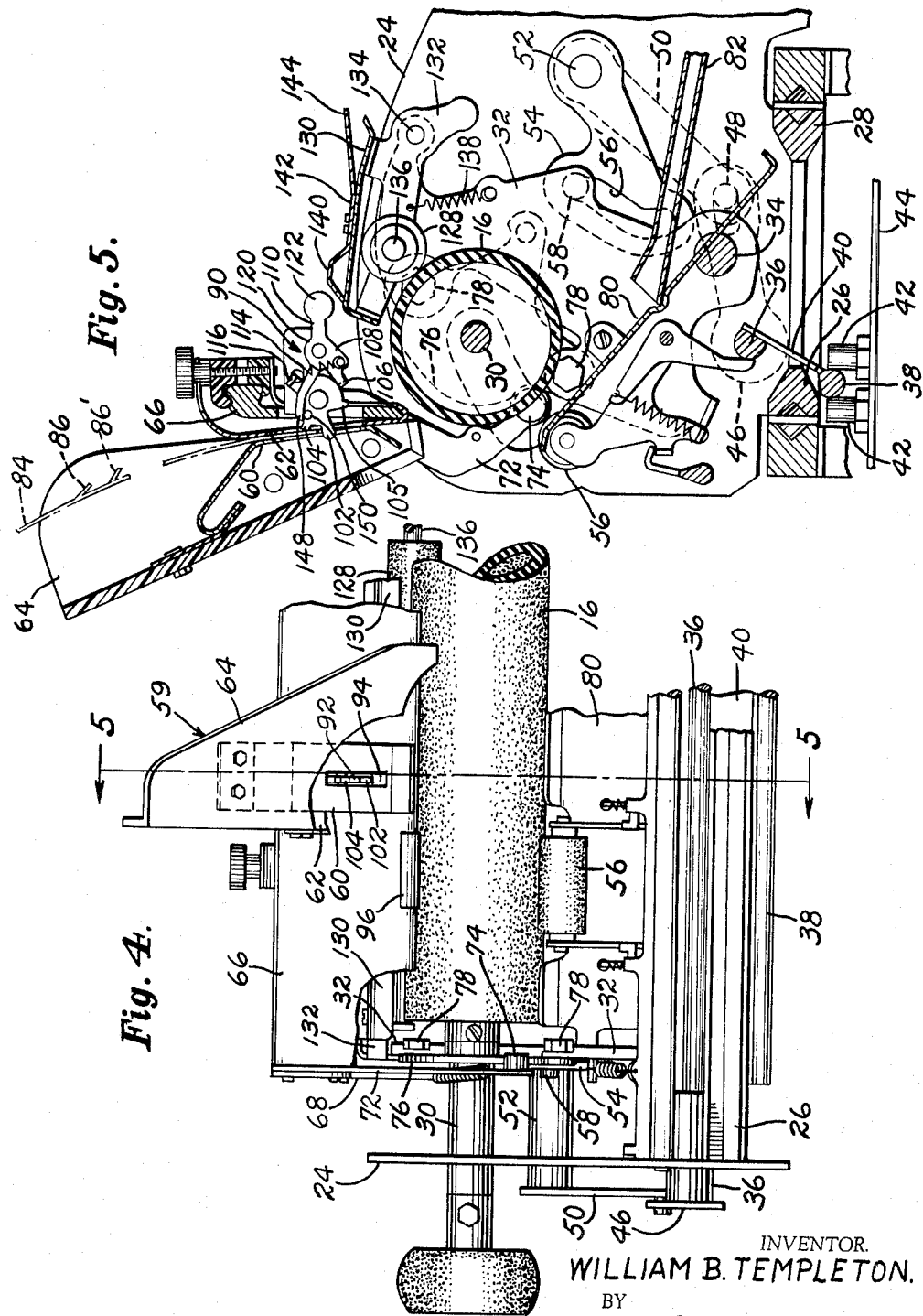

Oct. 12, 1965 W. B. TEMPLETON 3,211,270
LINE FIND MECHANISM
Filed Aug. 19, 1963 5 Sheets-Sheet 3
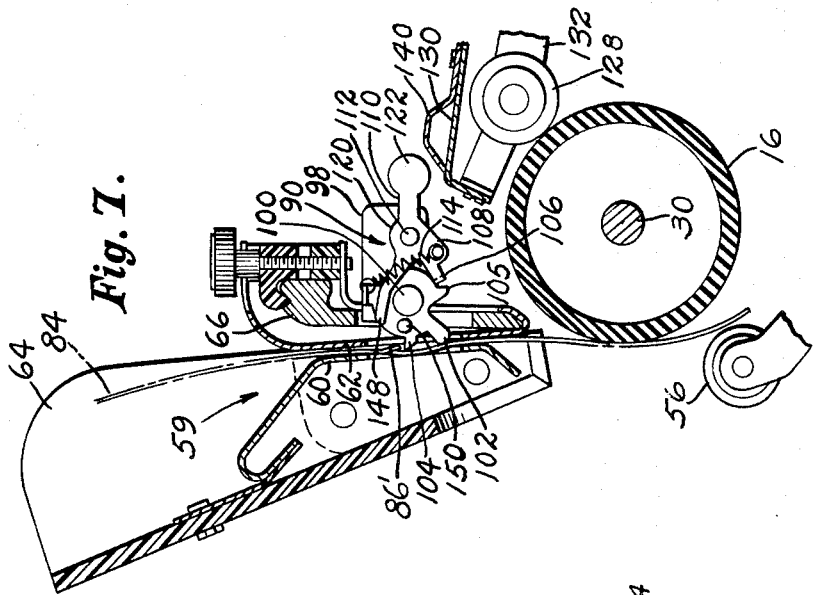
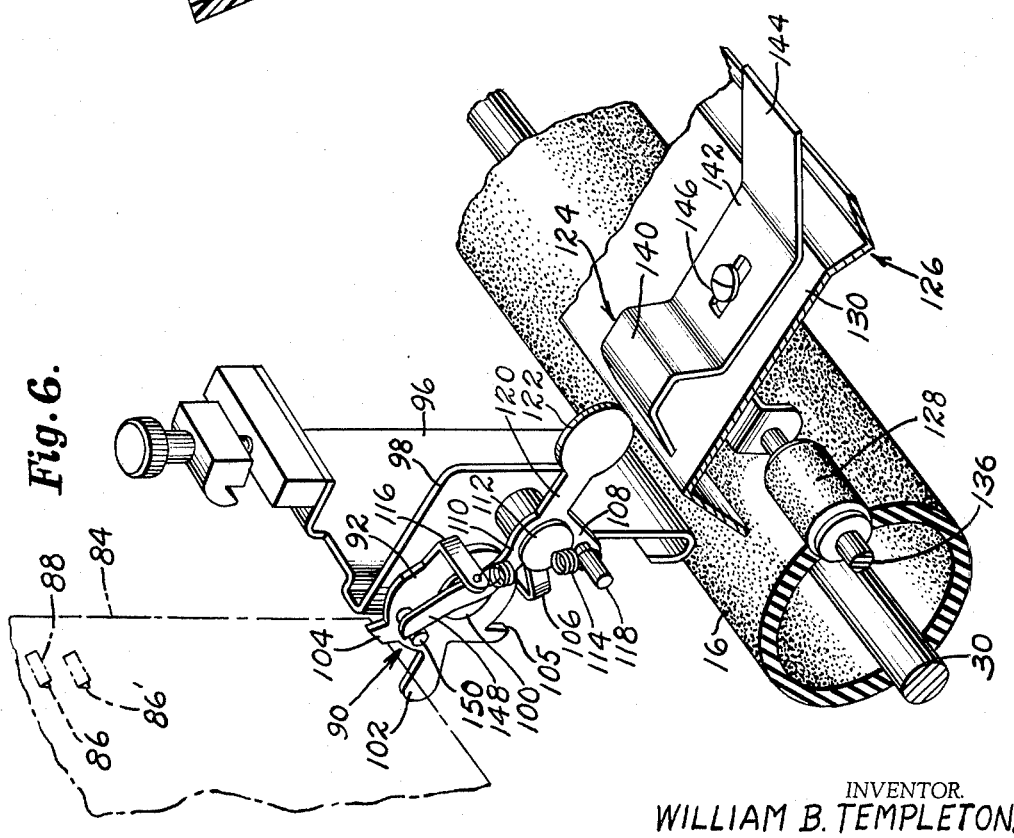
INVENTOR.
WILLIAM B. TEMPLETON.
BY
Wallace P. Lamb
ATTORNEY.

Oct. 12, 1965 W. B. TEMPLETON 3,211,270
LINE FIND MECHANISM
Filed Aug. 19, 1963 5 Sheets-Sheet 4

INVENTOR.
WILLIAM B. TEMPLETON.
BY
Wallace P. Lamb
ATTORNEY.

United States Patent Office 3,211,270
Patented Oct. 12, 1965

3,211,270
LINE FIND MECHANISM
William B. Templeton, Northville, Mich., assignor to Burroughs Corporation, Detroit, Mich., a corporation of Michigan
Filed Aug. 19, 1963, Ser. No. 303,109
6 Claims. (Cl. 197—127)

This invention relates generally to printing apparatus and particularly to record sheet line find devices therefor.

It is an object of the present invention to provide for a printing apparatus of an accounting machine, an improved line find device for stopping a ledger sheet, introduced into a printer guideway, at a position corresponding to a line designating slit in the ledger sheet.

Another object of the invention is to provide an inexpensive sheet operated mechanical line find device having provision for its retraction to avoid obstruction to further movement of a sheet along the guideway.

A further object of the invention resides in the provision of an improved accounting machine of the type having a platen that is retractable from a print position to allow easy manual insertion of a ledger sheet, and controlling in part a retractable function of a mechanical line find device.

Other objects of the invention will become apparent from the following detail description, taken in connection with the accompanying drawings in which:

FIG. 4 is a fragmentary front view of the machine;

FIG. 5 is a cross sectional view, taken along the line 5—5 of FIG. 4;

FIG. 6 is a fragmentary perspective view; and

FIGS. 7, 8, 9 and 10 are views similar to FIG. 5 showing a ledger sheet progressing to the print position in the machine.

Figure 1:
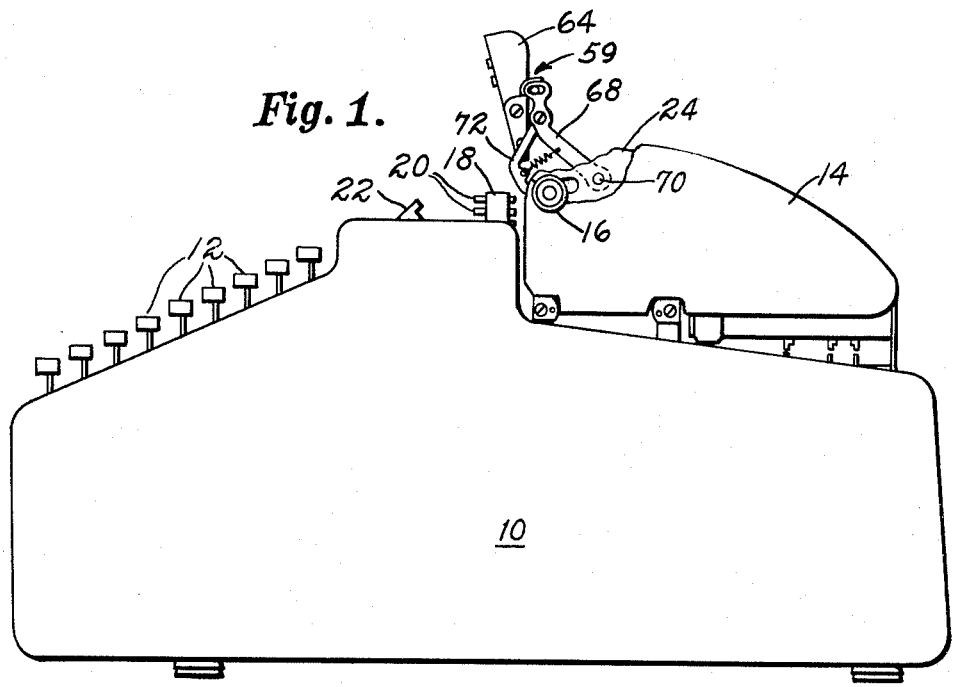
FIG. 1 is a side view of an accounting machine embodying features of the invention.
Figure 2:
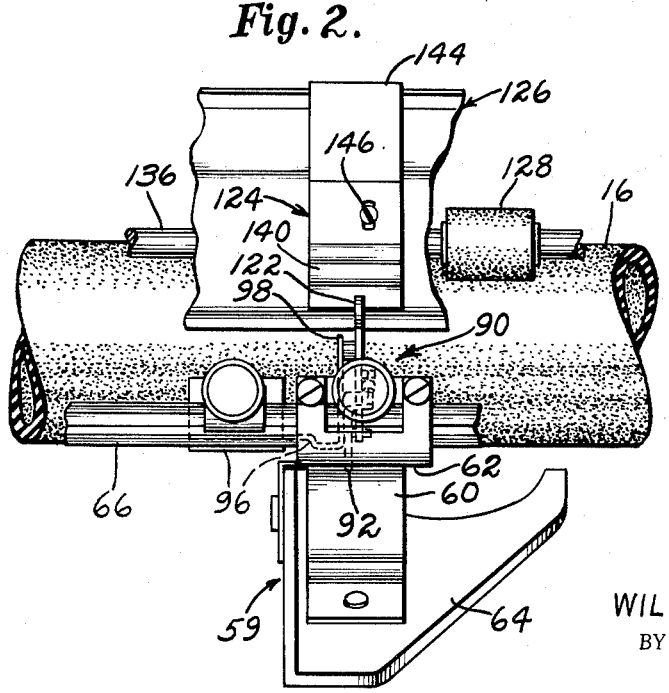
FIG. 2 is a fragmentary plan view of the machine with the machine casing removed.

Referring to the drawings by characters of reference, the accounting machine of FIG. 1 may be of any well known type for processing record sheets or cards, such as printing amounts in columns, and the machine is illustrated as including a mechanism housing 10, a keyboard 12 and an encased paper carriage 14. Mounted on the carriage 14 there is the usual roller type platen 16 and forwardly of the platen there is a print head 18 having a plurality of print elements 20 and a plurality of print hammers 22, only one of the latter of which is shown.

Figure 10:
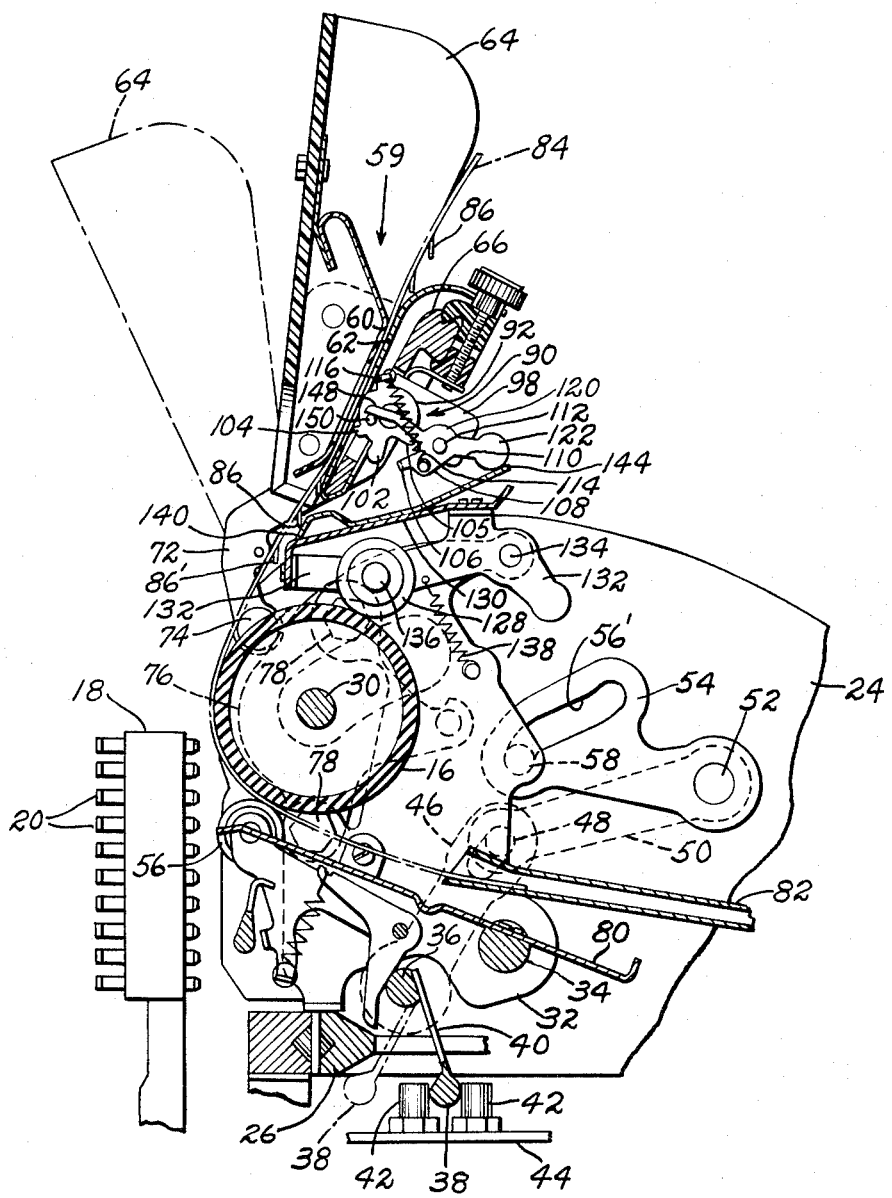

The carriage 14 has a frame structure which includes spaced apart upright side plates 24, rigidly connected together by cross members including front and rear bearing race rails 26 and 28 respectively, FIGS. 4 and 5, for supporting the carriage frame for transverse movement. The platen 16 extends, between and is rotatably mounted, as at 30, on a pair of plate-like rocker arms 32 which are pivoted below the platen to the carriage side plates 24 by pivot pins 34. Positioned forwardly of the carriage frame pivot pins 34 there is a transverse shaft 36, journaled for rotation on the carriage frame side plates 24, the shaft being rotatable by a transverse bail 38 having a plurality of arms 40 secured to a flattened portion of shaft 36. The bail is retained between a pair of rollers 42 mounted on a slide 44 which is horizontally movable from the normal position shown, rearwardly to swing the bail 38 and thus rotate shaft 36 in a counterclockwise direction, as seen in FIGS. 5 and 10. Affixed to the rotatable shaft 36 at each side of the carriage frame there is an arm 46 and these arms are respectively connected by slot and pin connections 48 to the free ends of a pair of arms 50 which are affixed to a transverse shaft 52 that is rotatably journaled in the frame side plates 24. Also affixed to the shaft is a pair of arms 54 having each a cam slot 56' to receive a cam follower 58 carried by the platen supporting arms, above the pivot pins 34. It will now be seen that rotation of shaft 36 in a counterclockwise direction by rearward movement of slide 44 swings the cam lever 54 clockwise. This swings the platen frame counterclockwise thus moving the platen 16 from its retracted position of FIG. 5 to its print position of FIG. 10. In its print position, the platen 16 engages a line of pressure rollers 56. As will later be more fully understood, the platen 16 on movement toward its print or closed position first engages and moves a record sheet downwardly in the guideway a predetermined distance.

A record card guideway structure 59 is mounted on the carriage frame side members 24 above the platen 16 and comprises, in general, a pair of plate members 60 and 62 in spaced apart broadside relationship, and a pair of side guide members 64. The side guide members are adjustably mounted on a horizontal rail 66 behind the rear guide plate 62. This structure is pivotally mounted by arms 68, FIG. 1, to the carriage frame side plates 24, as at 70. A pair of cam follower members 72 have upper ends connected respectively to the arms 68 and rollers 74 on the lower ends thereof to engage cams 76 which are fixed, as at 78, to the respective platen carrying arms 32. Thus, as the platen 16 is moved from the retracted or so-called open position of FIG. 5 to the print or closed position of FIG. 10, the cam 76 will pivot the cam followers 72 and move the guideway structure 59 to the position shown in full lines in FIG. 10. Fixed to the platen arms 32, below the platen 16 there is a rearwardly and downwardly inclined chute or plate 80 having a forward edge positioned between the pressure rollers 56 to guide a record sheet therefrom to a rearwardly positioned guideway section 82.

The above general description of an accounting machine carriage of the closed and open type is deemed to suffice as background material of the present invention, but for a more detailed description, reference may be had to the patent to Thomas M. Butler, No. 2,629,549, issued February 24, 1953, for "Automatic Function Control Mechanism for Accounting Machines."

Figure 3:
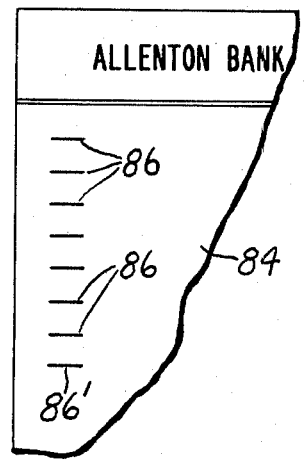
FIG. 3 is a fragmentary front view of a ledger sheet used in the present machine.
Figure 9:
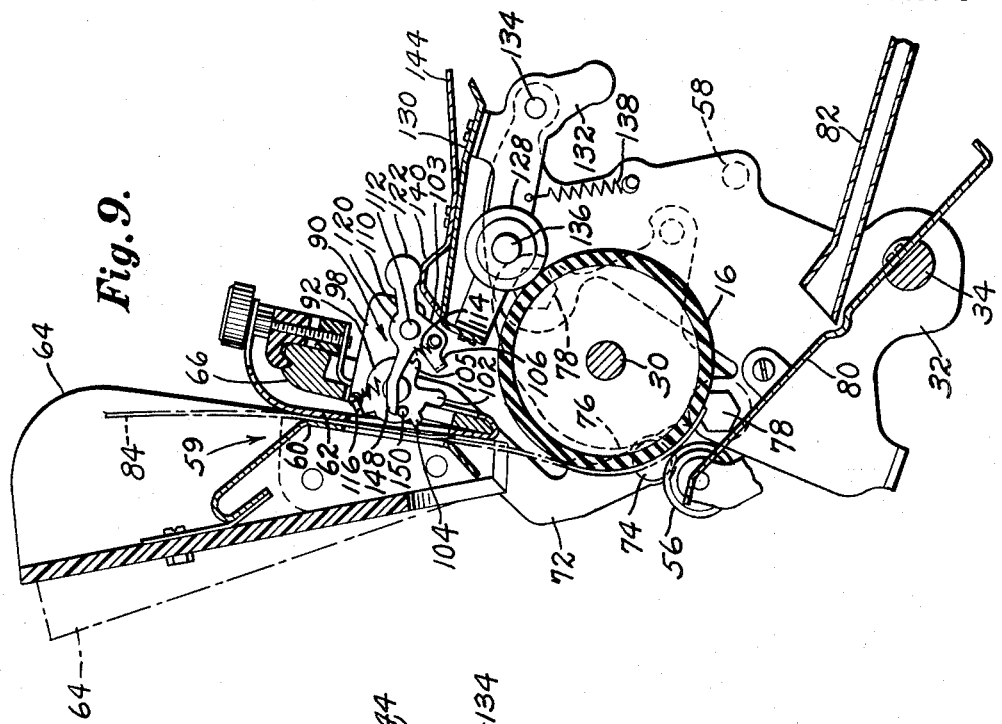
Figure 8:
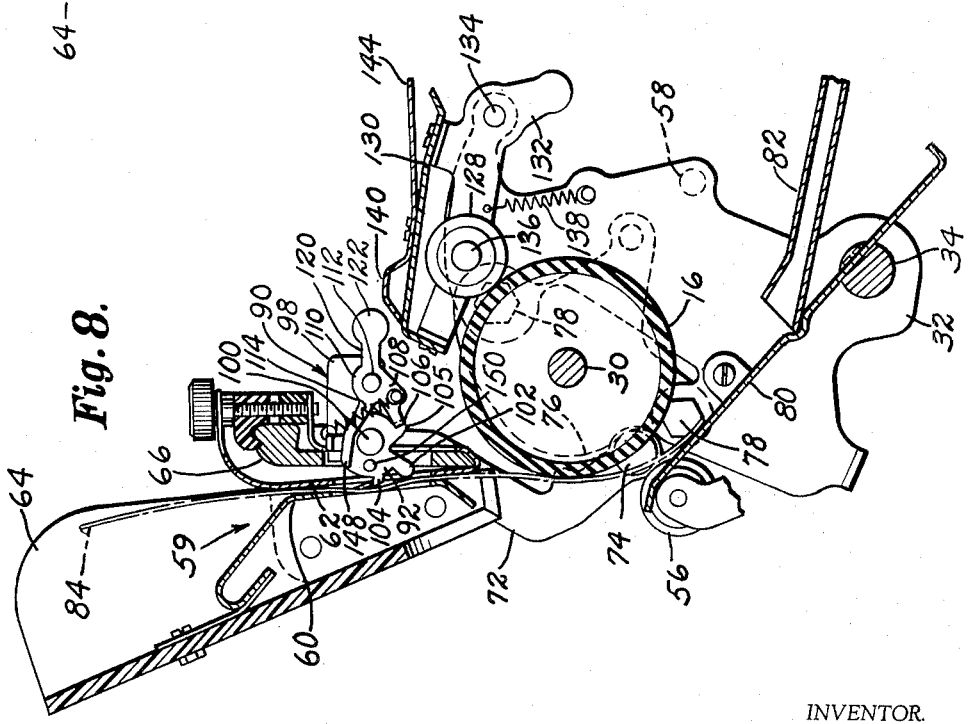

A fragment of a record sheet 84, of a type suitable for use in connection with the present invention, is illustrated in FIG. 3. Adjacent the leftward side edge of the sheet there is a vertical column of horizontal slit-like perforations 86 which designate lines that have been printed on the sheet. The lowermost slit, or slit 86' designates of course, the next available unused line on the record sheet. These slits are preferably made with a punch that laterally displaces the card area immediately above the slit such that in said area a small portion 88 of the card projects rearwardly and downwardly from the plane of the card as illustrated in FIG. 10. This provides an upper edge of the slit in position for abutment purposes in connection with the line find device hereinafter described in detail.

In accordance with my invention, I provide a line find device 90 for stopping a sheet at a position corresponding to the next line designating perforation in the sheet and of a character such that downward movement of a record sheet by the closing action of the machine platen 16 is effected without interference by the line find device. The line find device includes a rotary member or lever 92 which is mounted behind a clearance opening 94 in the rear guideway member 62 for rotation about an axis substantially parallel to the broadside of the guide member. A bracket 96 is secured to the back of the rail 66 and has a rearwardly directed end flange 98 on which the lever 92 is rotatably mounted by means of a pivot pin 100, FIG. 6.

The lever 92 includes a record sheet operated arm 102 and a sheet stop arm 104. Normally, the arm 102 extends across the sheet guideway in position for engagement by the leading edge of a record sheet 84, the lever 92 being rotatable in a counterclockwise direction FIGS. 5 to 10, by the manual insertion of the sheet. The sheet stop arm 104 is normally retracted from the guideway, the arm 104 being angularly displaced from the sheet operated arm 102 in a clockwise direction by an angle substantially equal to the angle of displacement of the arm 102, by the leading edge of a sheet, required for movement of the arm 102 out of the path of the sheet. In FIG. 7, the rotary line find lever 92 has been rotated by the leading edge of a record sheet through the required angular displacement to allow the leading edge to pass arm 102 and position arm 104 across the guideway for engagement by the upper edge of slit 86'. The lever 92 is provided thereon with a lug 105 which limits against a stop member 106 to limit rotation of arm 104 by sheet edge 88. The stop member 106 is provided by one end of an arm 108 of an actuator or lever 110 which is pivoted, as at 112, to the flange 98 of bracket 96. A coil spring 114 has one end attached to a lug 116 on lever 92 and the other end attached to a stud 118 on lever 110, the spring thus functioning as a return spring for both levers.

A rearwardly extending arm 120 of the lever 110 has a cam follower 122 on the free end thereof for engagement by an actuator or cam 124 that is carried by the rockable frame side arms 32 and thus is rockable with the platen 16 as the latter is rocked between retracted and print positions.

A mounting 126 is provided to carry a line of pressure rollers 128 above and in engagement with the platen 16, the rollers and platen providing a bight to receive a journal sheet (not shown) which is described in detail in the above mentioned Butler patent. In general, the mounting 126 comprises an elongated plate 130, FIG. 6, having end members 132 which are pivoted on a transverse rod 134 that is secured in and to the platen rocker arms 32. Forwardly of the rod 134, the pressure rollers are arranged in spaced relation on and along a rod 136 that is fixed to the end members 132. A spring 138 urges the rollers 128 into engagement with the platen 16. Mounted on the top of the plate 130 is the cam 142 which may be made of sheet metal having a forwardly positioned riser portion 140 and a rearwardly and upwardly inclined portion 144. The cam 124 is mounted for forward and rearward movement adjusted by a slotted hole and screw connection 146 with the plate 130.

The arm 110 has a forwardly extending arm 148 which, adjacent its end, engages a pin 150 that is carried by and extends laterally from one side of the line find lever 92. Thus, it will be seen that when lever 110 is pivoted by the cam 140, arm 148 acting against pin 150 will rotate lever 92 in a counterclockwise direction.

*Operation*

As previously mentioned, the operating parts of the machine will be normally in the positions shown in FIG. 5, with the platen 16 in its retracted or open position for ease of front feed manual sheet insertion. A record sheet is inserted into and manually moved downwardly in the guideway, the leading edge of the sheet engaging the operating arm 102, FIG. 5, of the rotary line find lever 92. Continued downward movement of the sheet rotates the lever 92 in a counterclockwise direction until angular displacement of arm 102 out of the guideway allows the leading edge of the sheet to pass thereby. Such displacement is calculated to position the sheet stop arm 104 across the guideway, as shown in FIG. 7, with the end of the arm lightly pressing against the rear face of the sheet in the path of travel of the vertical row of slits 86, 86' of the sheet. As the sheet is continued to be fed downwardly the displaced portion 88 of the lowermost slit 86' engages the stop arm 104 and rotates the line find lever 92 until lug 105 engages its stop member 106 at which time arm 104 is substantially perpendicular to the sheet preventing further downward movement thereof. The carriage is now closed, either automatically, or by depressing a carriage closing key, and this causes slide 44 to be moved rearwardly, as described in the above mentioned Butler patent. Such movement, through bail 38, rotates the shaft 36 counterclockwise, as viewed in FIGS. 5 to 10 and through connecting arms 46 and 50 rotates cam 54 clockwise which rocks the platen frame and consequently the platen 16 forwardly toward the record sheet. In its forward rocking movement, the platen 16 engages the record sheet and presses the sheet against the pressure rollers 56 and at about the same time, the cam 140 which has also been rocked forward with the platen, engages and pivots lever 120 counterclockwise. As a result, the stop member 106 is withdrawn from its effective position against lug 105 and at the same time lever 120 pivots the line find device lever 92 counterclockwise to swing the stop arm 104 out of the path of the sheet displaced portion 86'. Continued downward rocking movement of the platen 16 moves the sheet down until the unused line immediately below the displaced sheet portion is at the printing line.

During the rocking movement of the platen 16 toward its printing position, cam 76 is rotating and through the cam follower arm 72 tilts the sheet guideway structure rearwardly toward the full line position thereof, FIG. 10. Since the line find device 90 and operating lever 110 are mounted on the tiltable guideway structure, it will be seen that the cam follower 122 is rocking rearwardly at the same time that its cam 140 is rocking forwardly and that this provides for a quick retraction of the line find stop arm 104. In the print position of the platen 16, the follower 122 rests on the inclined rear cam portion 144, as shown in FIG. 10, to hold the stop arm 104 in retracted position without the sheet guideway.

What is claimed is:

1. In a machine for processing record sheets and having a print line, a line find device for stopping the feeding of a sheet to the print line at a position corresponding to the location of a line designating perforation in the sheet comprising a sheet guideway, a sheet operated rotary arm normally extending across said guideway in the path of a leading edge of a sheet enroute along the guideway, said rotary arm being rotatable by the leading edge of a sheet through a predetermined angle out of the path of the sheet, a sheet stopping arm to engage in a line designating perforation in a sheet and stop the sheet, said sheet stopping arm rotatable with said sheet operated arm and normally positioned without said guideway, said sheet stopping arm angularly displaced from said sheet operated arm by an angle substantially equal to said predetermined angle and counter to the direction of rotation of said sheet operated arm by the leading edge of a sheet, said sheet stopping arm being further rotatable to a position without said guideway for unobstructed travel of a sheet, and an actuator operatively connected to said sheet stopping arm and operable to further rotate said sheet stopping arm out of said guideway.

2. In a machine for processing record sheets and having a print line, a line find device for stopping the feeding of a sheet to the print line at a position corresponding to the location of a line designating perforation in the sheet comprising a sheet guideway, a sheet operated rotary arm normally extending across said guideway in the path of a leading edge of a sheet enroute along the guideway, said rotary arm being rotatable by the leading edge of a sheet through a predetermined angle out of the path of the sheet, a sheet stopping arm to engage in a line designating perforation in a sheet and stop the sheet, said sheet stopping arm rotatable with said sheet operated arm and normally positioned without said guideway, said sheet stopping arm angularly displaced from said sheet operated arm by an angle substantially equal to said predetermined angle and counter to the direction of rotation of said sheet operated arm by the leading edge of a sheet, said sheet stopping arm being further rotatable to a position without said guideway for unobstructed travel of a sheet, a movable stop member normally in position to limit rotation of said sheet stopping arm to the sheet stopping position, and an actuator operable to move said stop member away from its normal position for further rotation of said sheet stopping arm without said guideway.

3. In a machine for processing record sheets and having a print line, a line find device for stopping the feeding of a sheet to the print line at a position corresponding to the location of a line designating perforation in the sheet comprising a sheet guideway, a sheet operated rotary arm normally extending across said guideway in the path of a leading edge of a sheet enroute along the guideway, said rotary arm being rotatable by the leading edge of a sheet through a predetermined angle out of the path of the sheet, a sheet stopping arm to engage in a line designating perforation in a sheet and stop the sheet, said sheet stopping arm rotatable with said sheet operated arm and normally positioned without said guideway, said sheet stopping arm angularly displaced from said sheet operated arm by an angle substantially equal to said predetermined angle and counter to the direction of rotation of said sheet operated arm by the leading edge of a sheet, said sheet stopping arm being further rotatable to a position without said guideway for unobstructed travel of a sheet, a retractable stop member normally in position to limit rotation of said sheet stopping arm to the sheet stopping position at the print line, and an actuator operatively connected to said sheet stopping arm and to said retractable stop member and operable to retract the latter and rotate the former without said guideway.

4. In a machine for processing record sheets and having a print line, a line find device for stopping the feeding of a sheet to the print line at a position corresponding to the location of a line designating perforation in the sheet comprising a sheet guideway, a sheet operated rotary arm normally extending across said guideway in the path of a leading edge of a sheet enroute along the guideway, said rotary arm being rotatable by the leading edge of a sheet through a predetermined angle out of the path of the sheet, a sheet stopping arm to engage in a line designating perforation in a sheet and stop the sheet, said sheet stopping arm rotatable with said sheet operated arm and normally positioned without said guideway, said sheet stopping arm angularly displaced from said sheet operated arm by an angle substantially equal to said predetermined angle and counter to the direction of rotation of said sheet operated arm by the leading edge of a sheet, said sheet stopping arm being further rotatable to a position without said guideway for unobstructed travel of a sheet, an operating arm operatively connected to said sheet stopping arm and pivotal to further rotate the latter to a position without said guideway, a stop member normally in a position to limit rotation of said sheet stopping arm to the sheet stopping position and movable with said operating arm to an ineffective position, and an actuator operable to pivot said operating arm.

5. In a machine for processing record sheets, a line find device for stopping the feeding of a sheet at a position corresponding to the location of a line designating perforation in the sheet comprising, guide means defining a path of travel of a sheet, a platen and pressure roller mounted on opposite sides respectively of the path of sheet travel, said platen in a normally retracted position and movable therefrom into engagement with the pressure roller to hold a sheet, a sheet operated rotary arm normally extending across the path of sheet travel in the path of the leading edge of a sheet, said rotary arm being rotatable by the leading edge of a sheet through a predetermined angle out of the path of the sheet, a sheet stopping arm to engage in a line designating perforation in a sheet and rotatable with said rotary arm from a normally retracted position to a position extending across the path of a perforation in a sheet, a retractable stop member limiting rotation of said sheet stopping arm by an edge of the sheet perforation, said sheet stopping arm being further rotable to a position away from the path of sheet travel, and an actuator movable with the platen and operatively connected to said sheet stopping arm to rotate the latter away from the path of sheet travel and retract said stop member.

6. In a machine for processing record sheets and stopping a sheet at a position corresponding to a line designating slit in the sheet, a sheet guideway, a rotary arm normally projecting across said guideway for engagement and rotation out of said guideway by the leading edge of a sheet fed into said guideway, a sheet stop arm rotatable with said rotary arm and angularly spaced therefrom a distance substantially equal to the angular displacement of said arm by a sheet to position said stop arm across said guideway for engagement by an edge of the slit, a platen positioned along said guideway, pressure rollers cooperable with said platen normally in a retracted position spaced from said pressure rollers and bodily movable into engagement with said pressure rollers in a print position, and an actuator operatively connected to said rotary arm to rotate said stop member out of said guideway and operated by the bodily movement of said platen to the print position thereof.

References Cited by the Examiner

UNITED STATES PATENTS 2,832,454   4/58   Martin _____ 197—127

ROBERT E. PULFREY, *Primary Examiner.*